Dec. 16, 1958 R. S. SINK 2,864,480
CLUTCH ACTUATING MECHANISM
Filed June 21, 1957 3 Sheets-Sheet 1

Inventor
Russell S. Sink
By Paul O. Pippel
Attorney

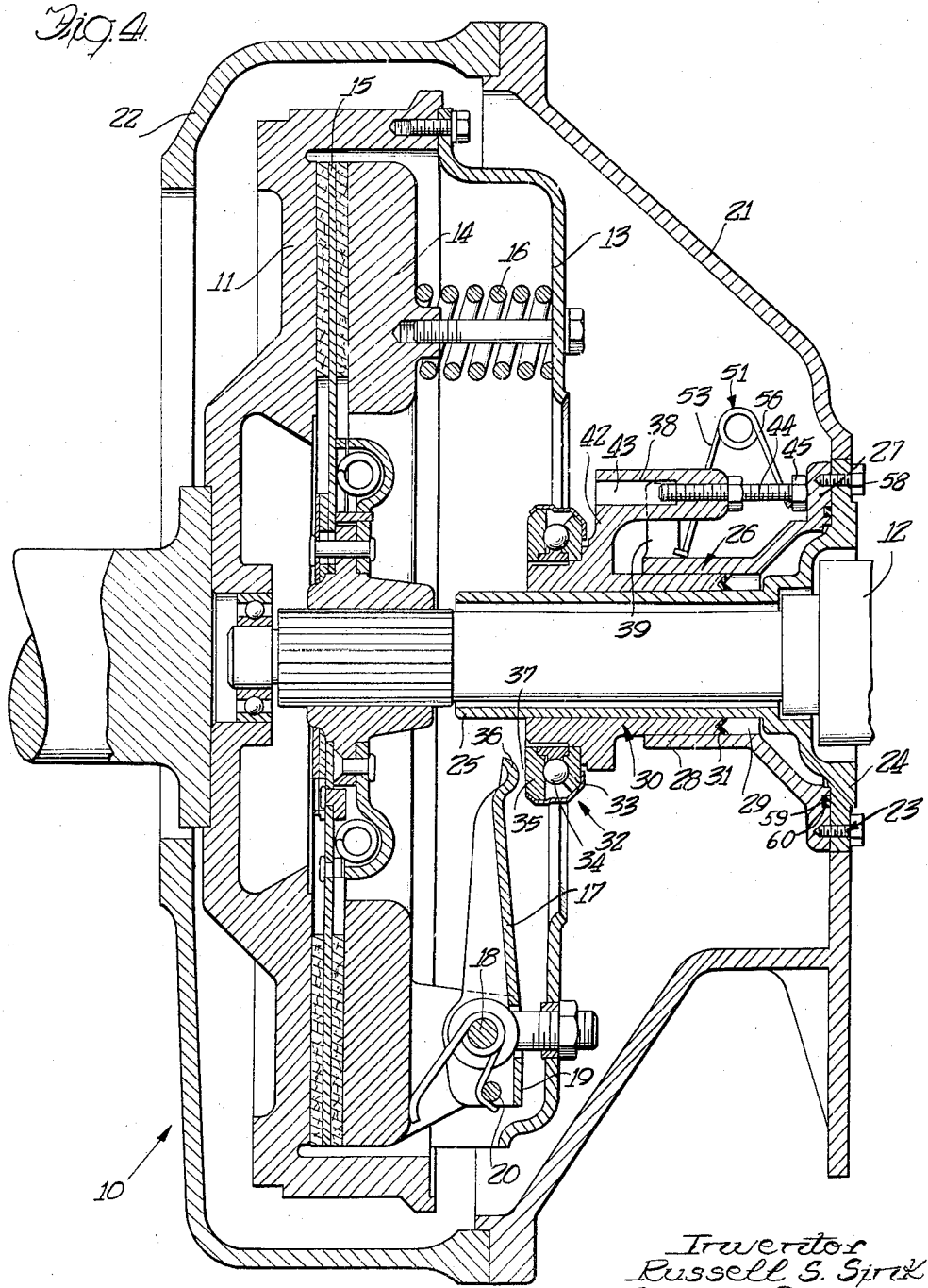

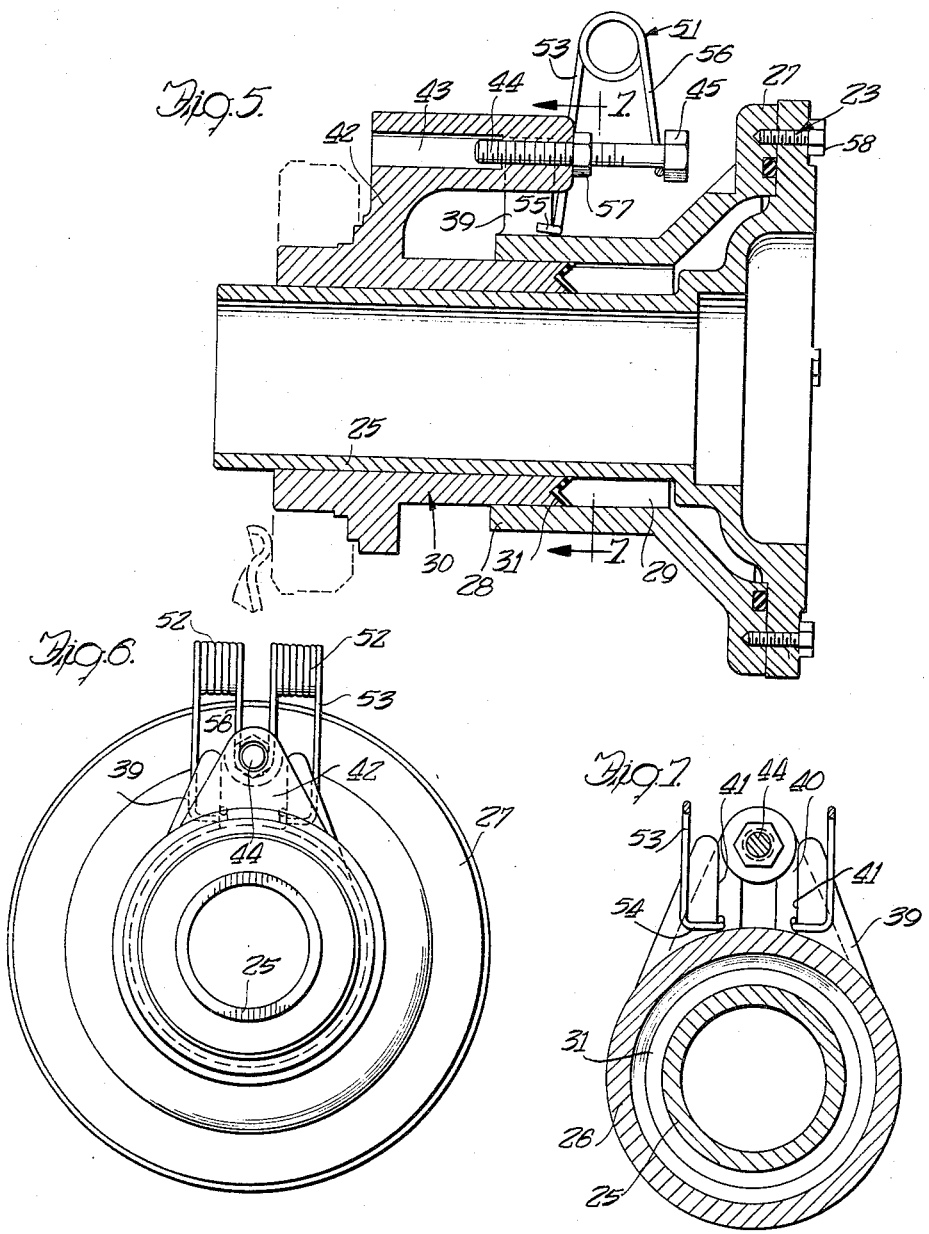

United States Patent Office 2,864,480
Patented Dec. 16, 1958

2,864,480
CLUTCH ACTUATING MECHANISM
Russell S. Sink, Fort Wayne, Ind., assignor to International Harvester Company, Chicago, Ill., a corporation of New Jersey Application June 21, 1957, Serial No. 667,150
4 Claims. (Cl. 192—91)

This invention relates to clutch actuating mechanism and more particularly to a hydraulic fluid pressure-operated device for releasing the drive through a friction-type disk clutch.

An important object of the invention is the provision of a compact sturdily constructed power operated device for rocking the clutch control or release levers in order to separate the drive elements of a friction clutch from the driven elements thereof.

A further object of the invention is to provide a power operated device for releasing the drive through a friction clutch whereby the usual mechanical linkage between the clutch operating lever or pedal and the clutch mechanism is eliminated.

A still further object is the provision of manually adjustable means for moving the clutch release thrust bearing axially with respect to the clutch throw-out or release levers for varying the clearance between the thrust bearing and the throw-out levers and to compensate for wear of the clutch elements and clutch facings.

Still another object is to provide spring biasing means for yieldably urging a thrust transmitting part of the power operated device to a position corresponding to the clutch engaged position which position is adjustable with reference to the clutch release means without effecting the yieldable force exerted by the spring means and thus the spring means maintains a constant degree of resilient force on the force-transmitting part of the device.

A still further object is the provision of a clutch actuating device which can be manufactured as a self-contained unit and which may be readily substituted for the clutch disengaging mechanism employed in installations which rely upon mechanical linkage for operation and which requires less effort on the part of the operator for operation than is ordinarily required to operate clutches which rely upon the mechanical linkage for operation.

Still another object is to provide a clutch actuating device which is simple in design and may be manufactured economically.

The foregoing and other important objects and desirable features inherent in and encompassed by the invention together with many of the purposes and uses thereof will become readily apparent from the reading of the ensuing description in conjunction with the annexed drawings in which:

Figure 4 is an enlarged cross-sectional view of the clutch and fluid pressure operated device for actuating the clutch to its released position;

Figure 5 is a cross-sectional view of the fluid pressure operated device showing the relative position of the components thereof corresponding to the clutch disengaged position;

Figure 6 is an end elevational view of the clutch actuating device shown in Figure 5; and Figure 7 is a sectional view taken substantially along line 7—7 of Figure 5.

Figure 1:
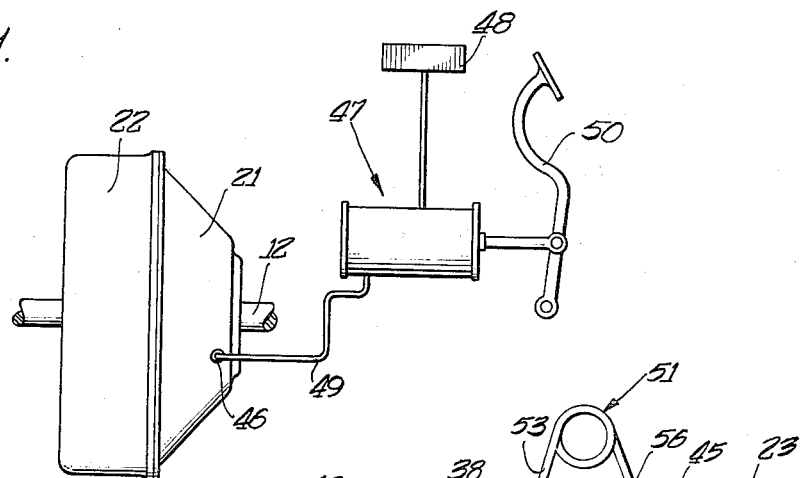
Figure 1 illustrates the relative arrangement of the invention with respect to a friction clutch and a clutch operating pedal in a motor vehicle.

Referring to the drawings in detail, wherein like reference characters represent like elements throughout the various views, the invention is shown incorporated in a motor vehicle clutch and clutch control system. The friction clutch assembly 10 which specifically forms no part of the present invention and is of a well known type currently used includes a drive element or flywheel 11 in which one end of a driven or transmission input shaft 12 is journalled. A cover plate 13 is mounted on the flywheel 11. Disposed between the flywheel 11 and the cover 13 is an axially shiftable pressure plate 14. A friction driven disk or element 15 is splined on the driven shaft 12 and is clamped between the pressure plate 14 and the flywheel 11 to establish a drive connection between the flywheel 11 and the driven shaft 12 by means of a plurality of circumferentially spaced clutch springs 16, one of which is shown in Figure 4, which springs bear against the cover plate 13 and the pressure plate 14.

In order to disrupt the drive connection between the flywheel 11 and the driven shaft 12, the flywheel 11 and the driven friction plate 15 are moved out of frictional engagement with each other by moving the pressure plate 14 axially away from the flywheel 11 against the biasing action of the clutch spring 16. Such movement of the clutch pressure plate 14 axially away from the flywheel 11 is accomplished by rocking of a plurality of circumferentially spaced release levers 17 (one of such levers being shown in Figure 4). Each lever is rockably supported by means of a pin 18 which is fastened to the cover plate. A relatively short, radially extending portion 19 of each lever 17 is provided with a pin 20 which extends through aligned apertures formed in the pressure plate 14 whereby when the radially innermost ends of the levers 17 receive an axial thrust to the left as viewed in Figure 4 to rock the levers 17 about pin 18 the pressure plate 14 is caused to move axially to the right away from the friction disk 15 against the resistance of clutch spring 16 to thereby break the drive connection between the flywheel 11 and the driven shaft 12. When the levers 17 are relieved of such axial thrust the clutch springs 16 shift the pressure plate 14 axially to clamp the driven element 15 to the flywheel 11 to reestablish the frictional drive engagement therebetween.

As in conventional power trains utilized in motor vehicles the front wall 21 of the change speed gear mechanism (not shown) is attached to the clutch bell housing 22 and serves as a rear cover therefor. The driven shaft 12 which is in reality the input shaft to the change speed transmission is journalled in bearings (not shown) mounted within the transmission housing, one of such bearings (not shown) being provided adjacent the point where the shaft 12 extends through the wall 21. A bearing cover 23 is suitably fastened to the wall 21 and encircles the shaft 12 as shown in Figure 4. The bearing cover 23 includes a radial extending flange portion 24 integrally formed with an axially extending sleeve-like section 25 through which the driven shaft 12 extends.

The fluid pressure operated actuating device for rocking the clutch lever 17 about pin 18 to release the driven element from frictional drive engagement with the flywheel 11 includes the front bearing cover 23 of the change speed transmission. The device also includes a cylindrical member 26 arranged concentrically with respect to the bearing cover 23. The cylindrical member 26 includes a radially extending flange 27 which abuts the radially extending flange 24 of the bearing cover 23. The cylindrical member 26 is suitably fastened to the bearing cover 23 by suitable means such as cap screws 58 which extend through the abutting flanges 24 and 27. The flange 27 is provided with an annular groove 59 in which a sealing ring 60 is enclosed for sealing the abutting surfaces of the flanges 24 and 27 in a fluid-tight manner. Integrally formed with and extending axially away from the flange 27 is a tubular section 28 which is arranged concentrically with the sleeve-like section 25 but is radially spaced outwardly therefrom to provide a fluid pressure receiving chamber 29. From the foregoing, it will be appreciated that the fluid pressure receiving chamber 29 is closed at one end in a fluid-tight manner and has its opposite end open. A sleeve-like piston 30 is mounted on the sleeve section 25 and is adapted to slide axially and have one end thereof slidably engaging the surfaces of the sections 28 and 25 partially defining the fluid receiving cylinder 29. A ring of resilient material 31 having a substantially V-shaped cross-section is provided on the end of the piston sleeve 30 movable within the cylinder or chamber 29 to prevent fluid leakage between the surface of the piston sleeve and the engaged surfaces of the tubular section 28 and the sleeve section 25.

An anti-friction bearing unit, designated generally by numeral 32, includes an inner race 33 which is press-fitted onto the end of piston 30 adjacent the clutch release levers 17. The bearing 32 includes a plurality of balls 34 and an outer race 35 which is adapted to engage the innermost terminal end portions 36 of the clutch release levers 17 during release of drive through the clutch mechanism and rotate with the clutch release levers 17 relative to the inner bearing race 33.

When the piston 30 is in its fully retracted position as shown in Figure 4 which position corresponds to the clutch engaged position, a predetermined axial spacing or clearance 37 is maintained between the terminal end 36 of the clutch release levers 17 and the outer race 35. A clearance 37 is provided to limit to a minimum the frictional drag imposed upon the pressure plate 14 during operation of the clutch mechanism since the levers 17 rotate with the drive wheel 11 while the piston 30 is restrained from rotational movement by a structure which will be described hereinafter in detail. Clearance 37 is also desirable to prevent unnecessary wear of the thrust bearing, undue wear of the contacting area of the clutch levers 17 and the outer race 35 and to obviate the possibility of the thrust bearing exerting enough pressure of the clutch levers to partially disengage the clutch and cause slipping of the driven disc and unnecessary facing wear. Thus only when the clutch is being released as when the outer bearing race 35 engages the terminal ends 36 of the levers 17 is there a frictional drag imposed upon the levers which frictional drag is reduced to a minimum by the anti-friction balls 34.

The piston 30 is restrained from rotating by means of keyed parts are formed on the end of the tubular section 28 of member 26 and a cylindrical portion 38 integrally formed with the piston 30. A guide portion carried by the tubular section 28 includes a radially extending ear 39 integrally formed on the end of the tubular section opposite the flange 27. The ear 39 is provided with a radially extending slot 40 having its outermost end open and the side walls of the slot 40 being defined by parallel surfaces 41. The cylindrical portion 38 is connected to the piston 30 by means of an integrally formed radially extending flange 42. The longitudinal axis of the cylindrical portion 38 is spaced from and is parallel to the rotational axis of the driven shaft 12. The cylindrical portion 38 is adapted to extend through the slot 40 and the diameter of the outer peripheral surface thereof is slightly less than the spacing between the vertical surfaces 41 defining the slot 40. It will be appreciated therefore that the piston 30 is guided while moving axially and also is prevented from rotating with respect to the tubular section 28 by means of cooperating surfaces of the cylindrical portion 38 and the ear 39. The cylindrical portion 38 is provided with a central bore 43, one end portion of which is provided with internal threads for receiving one end of a stop bolt 44. The opposite end of the stop bolt 44 is provided with an enlarged head 45 which is adapted to abut the flange 27 when the piston 30 is in its retracted position corresponding to the clutch engaged position as shown in Figure 4. Hydraulic fluid under pressure is introduced to the chamber or cylinder 29 through a pipe fitting 46 threaded into an opening in the outer cylindrical member 28. Operating pressure is imparted to the hydraulic fluid by means of a remotely located manually operable master cylinder assembly 47 which includes a reservoir 48, a pipe 49 has one end connected to the fitting 46 and its opposite end connected to the master cylinder assembly 47 to establish fluid communication between the master cylinder assembly and the fluid pressure receiving chamber 29. The master cylinder assembly 47 may be of any conventional type and includes a typically supported clutch pedal 50 which when rocked in a counterclockwise direction as viewed in Figure 1 by the application of pressure by the operator's foot supplies the chamber 29 with fluid under pressure. When the force of the operator's foot is removed from the clutch pedal 50 spring means, not shown, associated with the master cylinder assembly 47 returns the clutch pedal 50 to the position shown in Figure 1 which position corresponds to the clutch engaged position. The force for returning the clutch pedal 50 to its clutch engaged position is not only derived from the spring means of the master cylinder assembly 47 but also from the pressure of the fluid being emitted from the chamber 29 acting upon the master cylinder piston, not shown, as the clutch release spring 16 acting through the clutch levers 17 move the piston 30 to the right as viewed in Figure 4. It will be appreciated that the springs 16 are only capable of exerting force upon the piston 30 during the relative movement of the driving and driven elements of the clutch assembly 10 from their released position to their fully engaged position. Further movement to the right of the piston 30 to provide the adjusted clearance 37 between the outer race 35 and the terminal inner ends 36 of the levers 17 is accomplished by a spring element 51, the spring element 51 is formed from a single piece of material and includes a pair of helically wound sections 52. The end portions 53 are in the form of legs depending from the helically wound sections 52. The terminal ends of the legs 53 are provided with offset projections which engage the juncture of the ear 39 with the tubular section 28 of the cylindrical member 26. Each projection 54 is provided with a right angle tip 55 which engages a respective surface 41 of the slot 40 to maintain the ends of the legs 53 in abutting engagement with the ear 39. The central section 56 of a spring element 51 is in the form of a U-shaped loop having the ends thereof integrally formed with a respective helically wound section 52. The central section 56 is adapted to embrace the stop bolt 44 and the bight portion thereof is constructed on a range to abut the bottom surface of the enlarged head 45. From the foregoing it will be appreciated that the spring element 51 biases the piston 30 axially and yieldably urges the enlarged head 45 of the stop bolt 44 into abutting engagement with the radially extending flange 27 of the cylindrical member 26.

As the clutch facings wear and become thinner when measured in an axial direction the terminal ends of the levers 36 move to the right as viewed in Figure 4. Consequently to insure complete engagement of the drive and driven elements of the clutch assembly 10 and to maintain a predetermined axial spacing or clearance 37 between the inner ends 36 of the lever 17 and the outer race 35 of the anti-friction bearing unit 32, it is necessary to move the piston 30 axially to the right into the cylinder or chamber 29. This adjustment is made by first loosening a lock nut 57 threaded on the stop bolt 44 and normally abutting the end of the cylindrical portion 38 sufficiently to permit rotation of the stop bolt 44 with respect to the cylindrical portion 38. To move the piston 30 to the right axially as viewed in Figure 4 stop bolt 44 is rotated in the direction to thread the same into the cylindrical portion 38 to shorten the distance between the enlarged head 45 and the end of the cylindrical portion 38. After the proper clearance 37 is obtained with the clutch assembly 10 in its fully engaged condition, the lock nut 57 is tightened against the cylindrical portion 38 to maintain the adjustment of the stop bolt 44. It will be appreciated that regardless of the adjusted position of the piston 30 with respect to the inner terminal ends 36 of levers 17 the resilient force of the spring element 51 remains the same because the axial spacing between the enlarged head 45 and the ear 39 is unchanged. From the foregoing it will be appreciated that a simple and sturdy structure is provided for accurately adjusting piston 30 with respect to the clutch release lever 17 to compensate for wear of the drive and driven elements of the clutch assembly 10 and to maintain the proper desired clearance between the thrust bearing 35, and lever ends 36.

Figure 2:
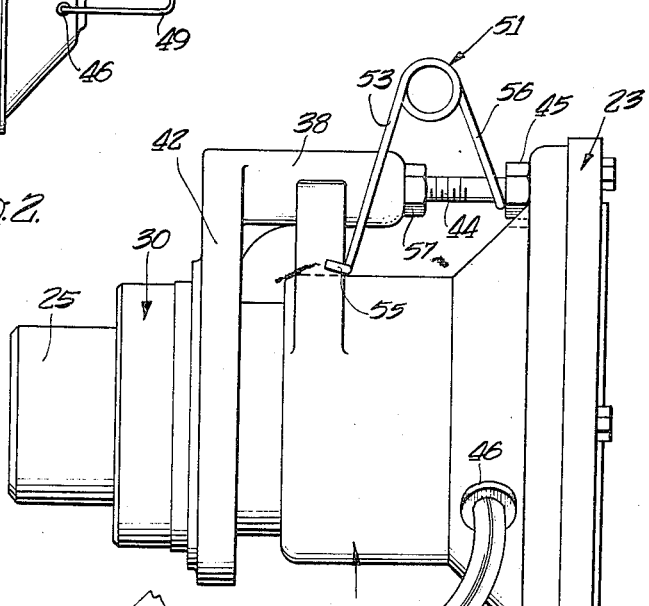
Figure 2 is a side elevational view of the fluid pressure operated device.
Figure 3:
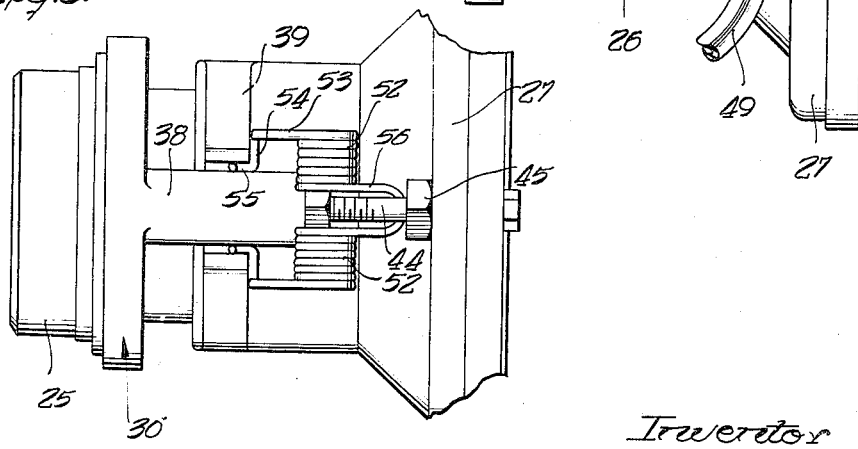
Figure 3 is a plan view of the fluid pressure operated device.

In operation assuming that the clutch assembly and the clutch actuating mechanism are in the clutch engaged position as illustrated in Figures 1, 2 and 4 for transmitting power to the input shaft 12 of the change-speed transmission and it is desired to disrupt the transmission of power between the shaft 12 and the driven flywheel 11. Fluid under pressure is admitted into the chamber 29. The pressure of the fluid introduced into the chamber 29 acts upon the piston 30 causing it to slide axially to the left as viewed in Figure 4 into engagement with the terminal ends 36 of the lever 17. Continued movement of the piston 30 axially to the left effects rocking of the levers 17 against the resistance of the clutch spring 16 to withdraw the pressure plate 14 from engagement with the driven element 15 to thus release the driven element from frictional engagement with the flywheel 11. When the pressure of the fluid within the chamber 29 is relieved as by the operator removing his foot from the clutch pedal 50 the springs 16 return the drive and driven elements of the clutch assembly 10 into driving engagement and the spring 16 and spring element 51 return the piston 30 to the position wherein the enlarged head 45 of the stop bolt 44 engages the flange 27.

The embodiment of the invention chosen for the purposes of description and illustration herein is that preferred for achieving the objects of the invention and developing the utility thereof in a most desirable manner, due regard being had to existing factors of economy, simplicity of design and construction and the improvements sought to be effected. It will be appreciated therefore that the particular structural functional aspects emphasized herein are not intended to exclude, but rather to suggest such other adaptations and modifications of the invention as fall within the spirit and scope of the invention as defined in the appended claims.

What is claimed is:

1. In a friction clutch mechanism for releasably drivingly connecting a shaft with a drive element including clutch release means axially movable between a first, clutch engaged position and a second, clutch release position, the combination comprising, means for moving said clutch release means axially from said first position to said second position including a first stationary sleeve concentric with said shaft, a second sleeve concentric with said shaft having a wall radially spaced from a wall of said first sleeve and having one end thereof fixed to and sealed to one end of said first sleeve, said spaced walls of said sleeves defining a chamber adapted to receive fluid under pressure, a sleeve-like piston concentric with said shaft and extending into said chamber, said piston being axially movable by fluid pressure in said chamber from a first position to a second position, one end of said piston being operatively engageable with said clutch release means during said axial movement of said piston from its first position to its second position to move said clutch release means from its first position to its second position, said end of said piston operatively engaging said clutch release means normally being axially spaced from said clutch release means when said piston and clutch release means are in their first positions, means for rotatively fixing said piston to said sleeves including an ear extending radially from said second sleeve and having a radially extending slot formed therethrough and a cylindrical part carried by said piston extending axially through said slot, said cylindrical part having its axis radially spaced and parallel to the rotational axis of said shaft, said cylindrical part being provided with a central axially extending threaded bore, means for adjusting the axial spacing between said clutch release means and said piston end when in their first positions including a member having one end threaded into said threaded bore and projecting axially therefrom, said member having an enlarged head portion adapted to engage a portion of said second sleeve to limit axial movement of said piston with respect to said sleeves in one direction to establish the said first position of said piston, said member being rotatable with respect to said cylindrical part to vary the axial positioning of said piston end with respect to said clutch release means and said sleeves, and means biasing said piston to its first position.

2. In a friction clutch mechanism substantially as set forth in claim 1, in which, said means biasing said piston to its first position includes a spring reacting against said ear and said enlarged head of said member threaded into said threaded bore.

3. In a friction clutch mechanism for releasably drivingly connecting a shaft with a drive, and clutch release elements rotatable in one direction to release the drive through the mechanism, the combination comprising, means for rotating said elements in said one direction including a first fixed sleeve concentric with said shaft and having a radially extending flange on one end thereof, a second sleeve concentric with said first sleeve having a wall spaced from a wall of said first sleeve, said spaced walls defining a chamber adapted to receive fluid under pressure, said second sleeve having a radially extending flange abutting said radially extending flange of said first sleeve, said abutting flanges being rigidly connected together and sealed in a fluid-tight manner, a sleeve-like piston concentric with said shaft and extending into said chamber, said piston being axially movable by fluid pressure in said chamber, a bearing unit mounted on said piston for axial movement therewith and engaging said elements during said axial movement to rotate said elements in said one direction, means for relatively rotatively fixing said sleeves and said piston including an ear extending radially from said second sleeve and having a radially extending slot formed therethrough and a cylindrical part carried by said piston and extending through said slot, said cylindrical part having its axis radially spaced and parallel to the rotational axis of said shaft, adjustable means for limiting the axial movement of said piston with respect to said sleeves in a direction opposite said one direction to release the drive through the mechanism including an axially extending threaded member carried by said cylindrical part and having an enlarged head adapted to abut the radially extending flange of said second sleeve, said threaded member being rotatable with respect to said cylindrical part to vary the axial positioning of said piston with respect to said chamber, and spring means for biasing said piston in a direction opposite said one direction to release the drive through the mechanism.

4. In a friction clutch mechanism substantially as set forth in claim 3, in which, said spring means for biasing said piston in a direction opposite said one direction to release the drive through the mechanism includes a spring reacting against said radially extending ear of said second sleeve and against said enlarged head of said threaded member carried by said cylindrical part.

References Cited in the file of this patent

UNITED STATES PATENTS

| 794,899 | Sturtevant | July 18, 1905 |
|---|---|---|
| 2,501,005 | Rockwell | Mar. 21, 1950 |
| 2,564,281 | Rockwell | Aug. 14, 1951 |
| 2,593,192 | Rockwell | Apr. 15, 1952 |
| 2,757,769 | Roise | Aug. 7, 1956 |